(12) United States Patent
Lee

(10) Patent No.: US 10,072,174 B2
(45) Date of Patent: Sep. 11, 2018

(54) HARD COATING COMPOSITION, AND HARD COATING FILM, WINDOW FILM AND DISPLAY DEVICE COMPRISING THE SAME

(71) Applicant: Dongwoo Fine-Chem Co., Ltd., Iksan-si, Jeollabuk-do (KR)

(72) Inventor: Seung-Woo Lee, Hwaseong-si (KR)

(73) Assignee: Dongwoo Fine-Chem Co., Ltd., Iksan-si, Jeollabuk-do (KR)

(*) Notice: Subject to any disclaimer, the term of this patent is extended or adjusted under 35 U.S.C. 154(b) by 0 days.

(21) Appl. No.: 15/499,083

(22) Filed: Apr. 27, 2017

(65) Prior Publication Data
US 2017/0313900 A1 Nov. 2, 2017

(30) Foreign Application Priority Data
Apr. 27, 2016 (KR) .................. 10-2016-0051452

(51) Int. Cl.
| C09D 4/00 | (2006.01) |
|---|---|
| C08K 5/544 | (2006.01) |
| C09D 135/02 | (2006.01) |
| C09D 7/61 | (2018.01) |
| C09D 7/40 | (2018.01) |
| C09D 4/06 | (2006.01) |
| C08K 5/549 | (2006.01) |
| C08K 3/20 | (2006.01) |

(52) U.S. Cl.
CPC ............. *C09D 135/02* (2013.01); *C09D 4/06* (2013.01); *C09D 7/61* (2018.01); *C09D 7/67* (2018.01); *C08K 3/20* (2013.01); *C08K 5/549* (2013.01); *C08K 5/5442* (2013.01)

(58) Field of Classification Search
None
See application file for complete search history.

(56) References Cited

U.S. PATENT DOCUMENTS

2010/0330359 A1* 12/2010 Ishikawa .................... C08J 7/18
428/325

FOREIGN PATENT DOCUMENTS

| JP | 2010070602 A | * | 4/2010 |
|---|---|---|---|
| KR | 1020130074167 A | | 7/2013 |
| KR | 1020160051445 A | | 5/2016 |
| KR | 1020160051452 A | | 5/2016 |

* cited by examiner

*Primary Examiner* — Vu A Nguyen
(74) *Attorney, Agent, or Firm* — TraskBritt, P.C.

(57) ABSTRACT

Described is a hard coating composition composed of a silazane compound, a polyfunctional (meth)acryl-based dendrimer compound or a polyfunctional urethane (meth) acrylate having a cyclohexyl group, a photoinitiator and a solvent, and to a hard coating film, a window film, and a display device including the same, thus exhibiting superior scratch resistance, hardness and flexibility.

22 Claims, No Drawings

HARD COATING COMPOSITION, AND HARD COATING FILM, WINDOW FILM AND DISPLAY DEVICE COMPRISING THE SAME

CROSS REFERENCE TO RELATED APPLICATION

This application claims the benefit of Korean Patent Application No. KR 10-2016-0051452, filed Apr. 27, 2016, the disclosure of which is hereby incorporated herein in its entirety by this reference.

TECHNICAL FIELD

This application relates to a hard coating composition and to a hard coating film and a display device including the same. More particularly, this disclosure relates to a hard coating composition comprising a silazane compound, a polyfunctional (meth)acryl-based dendrimer compound or a polyfunctional urethane (meth)acrylate having a cyclohexyl group, a photoinitiator and a solvent, and to a hard coating film and a display device including the same.

BACKGROUND

Recently, thin display devices, including flat-panel displays such as liquid crystal displays or organic light-emitting diode displays, are receiving a lot of attention. In particular, these thin display devices are provided in the form of a touch-screen panel, and are widely useful for a variety of smart devices characterized by portability, including not only smart phones and tablet PCs but also various wearable devices.

Such display devices in portable touch-screen-panel form are configured such that a window film for display protection is placed on a display panel in order to protect the display panel from scratches or external impacts. In most cases, reinforced glass for displays is used as the window film. The reinforced glass for displays is thinner than typical glass, but is manufactured so as to have high strength and high scratch resistance.

However, reinforced glass is heavy and is thus unsuitable for use in lightweight portable devices and is also difficult to realize break-resistance due to its poor ability to withstand external impact. Moreover, such reinforced glass cannot be curved beyond a predetermined level, making it unsuitable to serve as a flexible display material having bending or folding capability.

Thorough research is ongoing into optical plastic covers having strength or scratch resistance corresponding to those of reinforced glass while ensuring flexibility and impact resistance. The optical transparent plastic cover material, which is flexible compared to typical reinforced glass, may include polyethylene terephthalate (PET), polyether sulfone (PES), polyethylene naphthalate (PEN), polyacrylate (PAR), polycarbonate (PC), and polyimide (PI). However, these polymer plastic substrates may exhibit poor hardness and scratch resistance and insufficient impact resistance compared to reinforced glass for use in the window film for display protection. Hence, many attempts have been made to attain desired properties by coating these plastic substrates with a composite resin composition.

Thus, high hardness is ensured by forming a hard coating on a plastic substrate film. A typical hard coating is formed using a composition comprising a resin having a photocurable functional group, a curing agent or a curing catalyst and other additives. In particular, a composite resin having a polyfunctional group is applied on an optical plastic substrate film, whereby the resulting substrate film is suitable for use as a window for display protection having improved hardness and scratch resistance.

However, a typical photocurable composite resin is disadvantageous in that it is difficult to achieve high hardness comparable with that of reinforced glass and in that curling may significantly occur due to shrinkage upon curing. Furthermore, such a composite resin does not exhibit sufficient flexibility, and is thus unsuitable for use in a protective window film for a flexible display device.

Korean Patent Application Publication No. 10-2013-0074167 discloses a plastic substrate having high hardness and flexibility. In this case, however, a hard coating layer formed on the substrate merely functions to increase hardness and chemical resistance, and does not increase flexibility.

CITATION LIST

Patent Literature

Korean Patent Application Publication No. 10-2013-0074167

BRIEF SUMMARY

Accordingly, provided is a hard coating composition having superior scratch resistance, hardness and flexibility. In addition, provided is a hard coating film formed using the hard coating composition. Further, provided is a display device including the hard coating film.

Therefore, provided is a hard coating composition comprising a silazane compound of Chemical Formula 1 or 2 below, a polyfunctional (meth)acryl-based dendrimer compound of Chemical Formula 3 below, or a polyfunctional urethane (meth)acrylate having a cyclohexyl group, a photoinitiator, and a solvent.

[Chemical Formula 1]
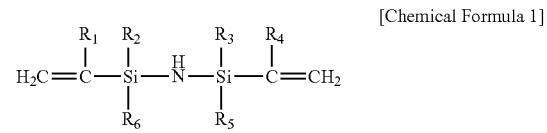

[Chemical Formula 2]
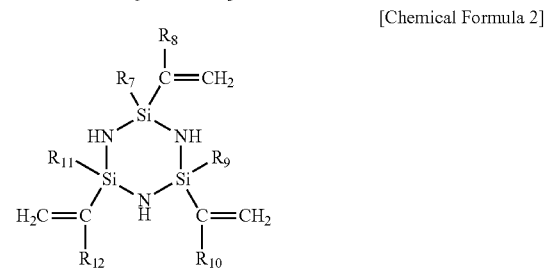

[Chemical Formula 3]

In Chemical Formulas 1 to 3, $R_1$ to $R_6$, which are each identical to or different from each other, are an alkyl group having 1 to 10 carbon atoms, $R_7$ to $R_{12}$, which are independently identical to or different from each other, are hydrogen or an alkyl group having 1 to 10 carbon atoms, $R_{13}$ is an alkyl group having 2 to 5 carbon atoms, n is an integer of 2 to 4, and $R_{14}$ is a compound of Chemical Formula 4 below.

[Chemical Formula 4]

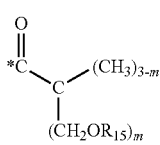

In Chemical Formula 4, m is 2 or 3 and $R_{15}$ is hydrogen or a (meth)acrylate group, at least one $R_{15}$ being a (meth)acrylate group.

In addition, provided is a hard coating film formed by applying the hard coating composition.

Also provided is a window film including the hard coating film.

In addition, provided is a display device including the hard coating film.

A hard coating composition can exhibit superior hardness and scratch resistance. Also, the hard coating composition hereof may enable control of a curing density, thus relieving curling and improving flexibility.

In addition, a hard coating film formed by applying the hard coating composition of this disclosure can exhibit superior scratch resistance, hardness and flexibility.

Also, the hard coating film can be applied to a flexible display device.

DETAILED DESCRIPTION

Hereinafter, a detailed description of this disclosure will be given.

This disclosure addresses a hard coating composition comprising a silazane compound of Chemical Formula 1 or 2 below, a polyfunctional (meth)acryl-based dendrimer compound of Chemical Formula 3 below or a polyfunctional urethane (meth)acrylate having a cyclohexyl group, a photoinitiator, and a solvent.

[Chemical Formula 1]

$$H_2C=\underset{R_6}{\underset{|}{\overset{R_1}{\overset{|}{C}}}}-\underset{|}{\overset{R_2}{\overset{|}{Si}}}-\overset{H}{N}-\underset{R_5}{\underset{|}{\overset{R_3}{\overset{|}{Si}}}}-\underset{}{\overset{R_4}{\overset{|}{C}}}=CH_2$$

[Chemical Formula 2]

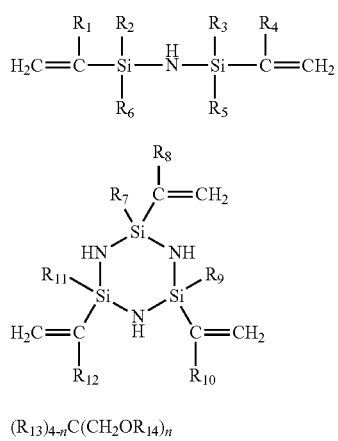

[Chemical Formula 3]

$(R_{13})_{4-n}C(CH_2OR_{14})_n$

In Chemical Formulas 1 to 3, $R_1$ to $R_6$, which are each identical to or different from each other, are an alkyl group having 1 to 10 carbon atoms, $R_7$ to $R_{12}$, which are independently identical to or different from each other, are hydrogen or an alkyl group having 1 to 10 carbon atoms, $R_{13}$ is an alkyl group having 2 to 5 carbon atoms, n is an integer of 2 to 4, and $R_{14}$ is a compound of Chemical Formula 4 below.

[Chemical Formula 4]

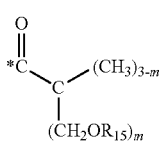

In Chemical Formula 4, m is 2 or 3, and $R_{15}$ is hydrogen or a (meth)acrylate group, at least one $R_{15}$ being a (meth)acrylate group.

The hard coating composition of this disclosure may exhibit superior scratch resistance and may adjust the rate of radical polymerization to thus control a curing density. Accordingly, a hard coating composition having high hardness, resistance to curling, and flexibility can be provided.

Below is a description of individual components of the hard coating composition according to this disclosure.

(A) Silazane Compound

The hard coating composition of this disclosure includes a silazane compound of Chemical Formula 1 or 2 below.

[Chemical Formula 1]

$$H_2C=\underset{R_6}{\underset{|}{\overset{R_1}{\overset{|}{C}}}}-\underset{|}{\overset{R_2}{\overset{|}{Si}}}-\overset{H}{N}-\underset{R_5}{\underset{|}{\overset{R_3}{\overset{|}{Si}}}}-\underset{}{\overset{R_4}{\overset{|}{C}}}=CH_2$$

[Chemical Formula 2]

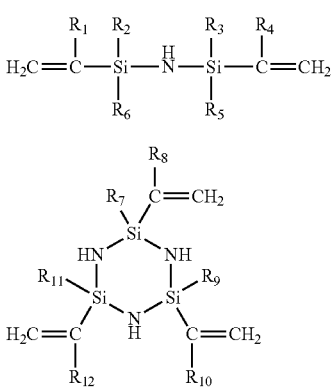

In Chemical Formulas 1 and 2, $R_1$ to $R_6$, which are each identical to or different from each other, are an alkyl group having 1 to 10 carbon atoms, and $R_7$ to $R_{12}$, which are independently identical to or different from each other, are hydrogen or an alkyl group having 1 to 10 carbon atoms.

The silazane compound of Chemical Formula 1 or 2, having vinyl groups at both ends thereof, may be subjected to UV curing, and a hard coating layer thereof may also exhibit increased scratch resistance by virtue of the structural feature due to Si—NH—Si bonding.

In addition, the silazane compound of Chemical Formula 1 or 2 is included in an amount of 10 to 50 wt %, and preferably 15 to 40 wt %, based on the total weight of solids in the hard coating composition of the disclosure.

If the amount of the silazane compound of Chemical Formula 1 or 2 is less than 10 wt %, the improvement in scratch resistance is insignificant. On the other hand, if the amount thereof exceeds 50 wt %, it is difficult to realize hardness of the hard coating layer.

As used herein, the term "total weight of solids" refers to the remaining components other than the solvent.

The hard coating composition of this disclosure includes a polyfunctional (meth)acryl-based dendrimer compound or a polyfunctional urethane (meth)acrylate having a cyclohexyl group.

(B) Polyfunctional (Meth)Acryl-Based Dendrimer Compound

The hard coating composition of this disclosure includes a polyfunctional (meth)acryl-based dendrimer compound of Chemical Formula 3 below.

$(R_{13})_{4-n}C(CH_2OR_{14})_n$ [Chemical Formula 3]

In Chemical Formula 3, $R_{13}$ is an alkyl group having 2 to 5 carbon atoms, n is an integer of 2 to 4, and $R_{14}$ is a compound of Chemical Formula 4 below.

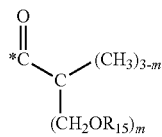

[Chemical Formula 4]

In Chemical Formula 4, m is 2 or 3, and $R_{15}$ is hydrogen or a (meth)acrylate group, at least one $R_{15}$ being a (meth)acrylate group.

In this case, the polyfunctional (meth)acryl-based dendrimer compound of Chemical Formula 3 is a second- or third-generation dendrimer compound, and contains at least one (meth)acrylate group at the branch end thereof and thus functions as a polymerizable compound in the hard coating composition.

The term "dendrimer compound" refers to a compound configured such that a molecular chain is regularly polymerized outward from the center thereof in accordance with a certain rule, and the term "generation" in the dendrimer compound refers to a compound configured such that a polymerizable functional group is polymerized from the center thereof to thus form branches. When the branch ends of the formed first generation are further polymerized, the second generation may result, and polymerization may be repeatedly carried out.

In Chemical Formulas 3 and 4, n and m indicate the number of occurrences per generation, which means the number of polymerizable functional groups in each generation, and the total number of occurrences of the synthesized dendrimer compound is obtained by multiplying the number of occurrences per generation.

The polyfunctional (meth)acryl-based dendrimer compound of Chemical Formula 3 is a component for appropriately controlling the molecular weight of a polymer and the cross-linking density thereof during polymerization. Specifically, the polyfunctional (meth)acryl-based dendrimer compound of Chemical Formula 3 is polymerized so as to have branches radiating outward from the center thereof upon polymerization, and a polymerizable functional group is formed at each branch end. Accordingly, compared to a typical polyfunctional acrylate monomer, the dendrimer compound is structurally characterized by having more functional groups relative to the molecular weight with an increase in the generation, and also characterized in that the functional groups are distributed at the ends thereof to thus increase bendability of the core portion upon curing. Thus, a hard coating composition, having high hardness, resistance to curling, and flexibility, may result.

The polyfunctional (meth)acryl-based dendrimer compound of the disclosure has a structure of the second generation or more, and the end thereof may be substituted with an acrylate to thus be useful in UV curing.

The schematic polymerization of the dendrimer compound according to an embodiment of this disclosure may be represented by Scheme 1 below.

[Scheme 1]

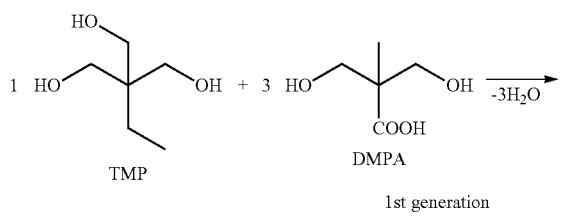

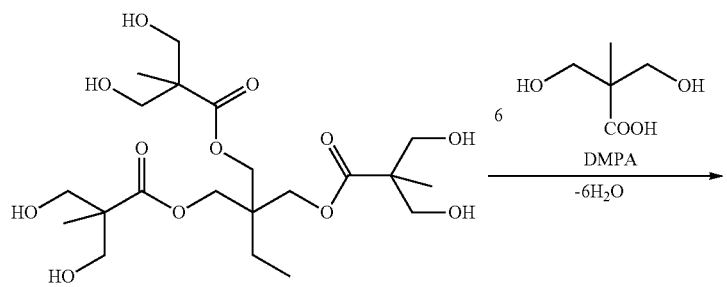

-continued
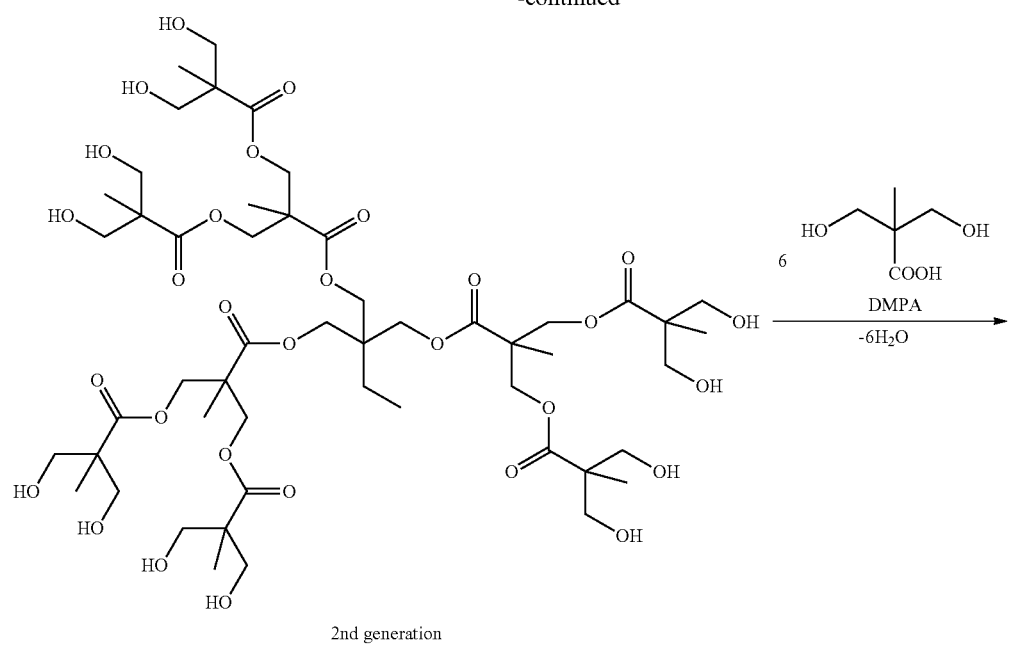
2nd generation
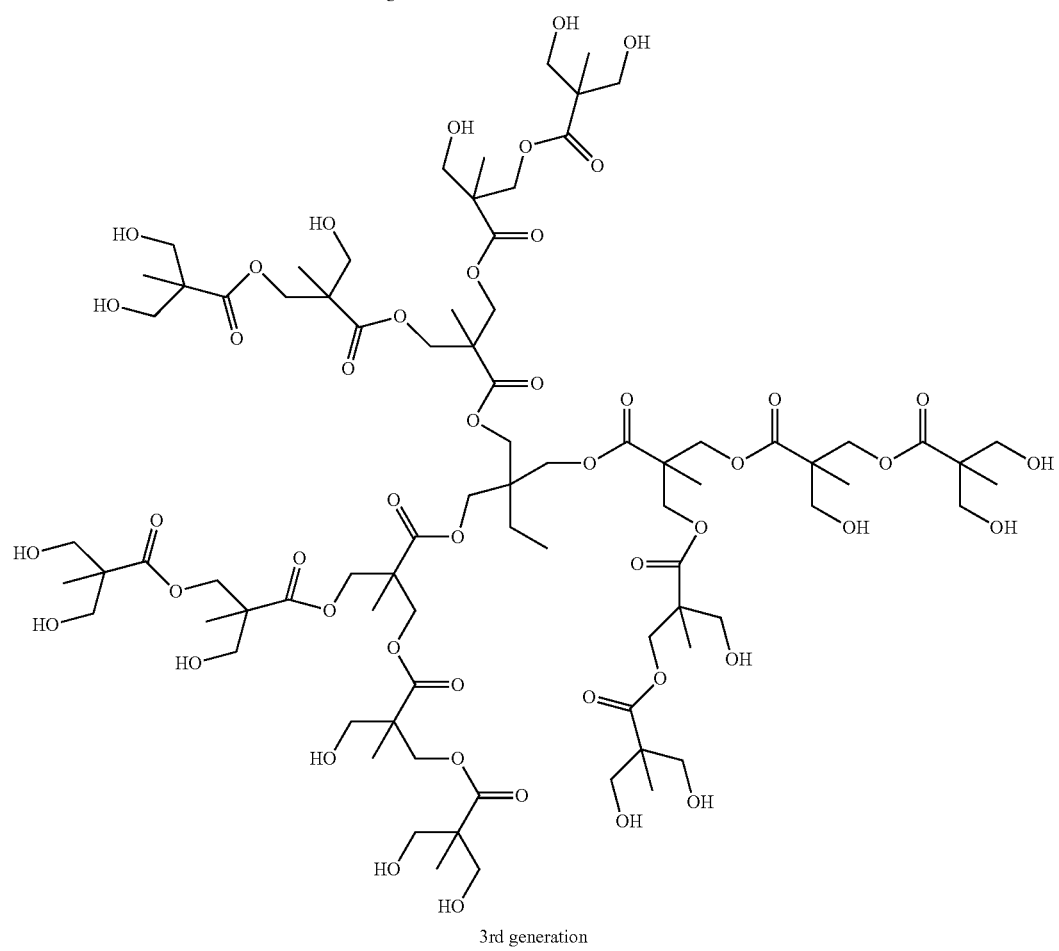
3rd generation
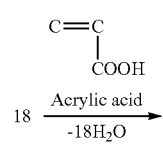

-continued

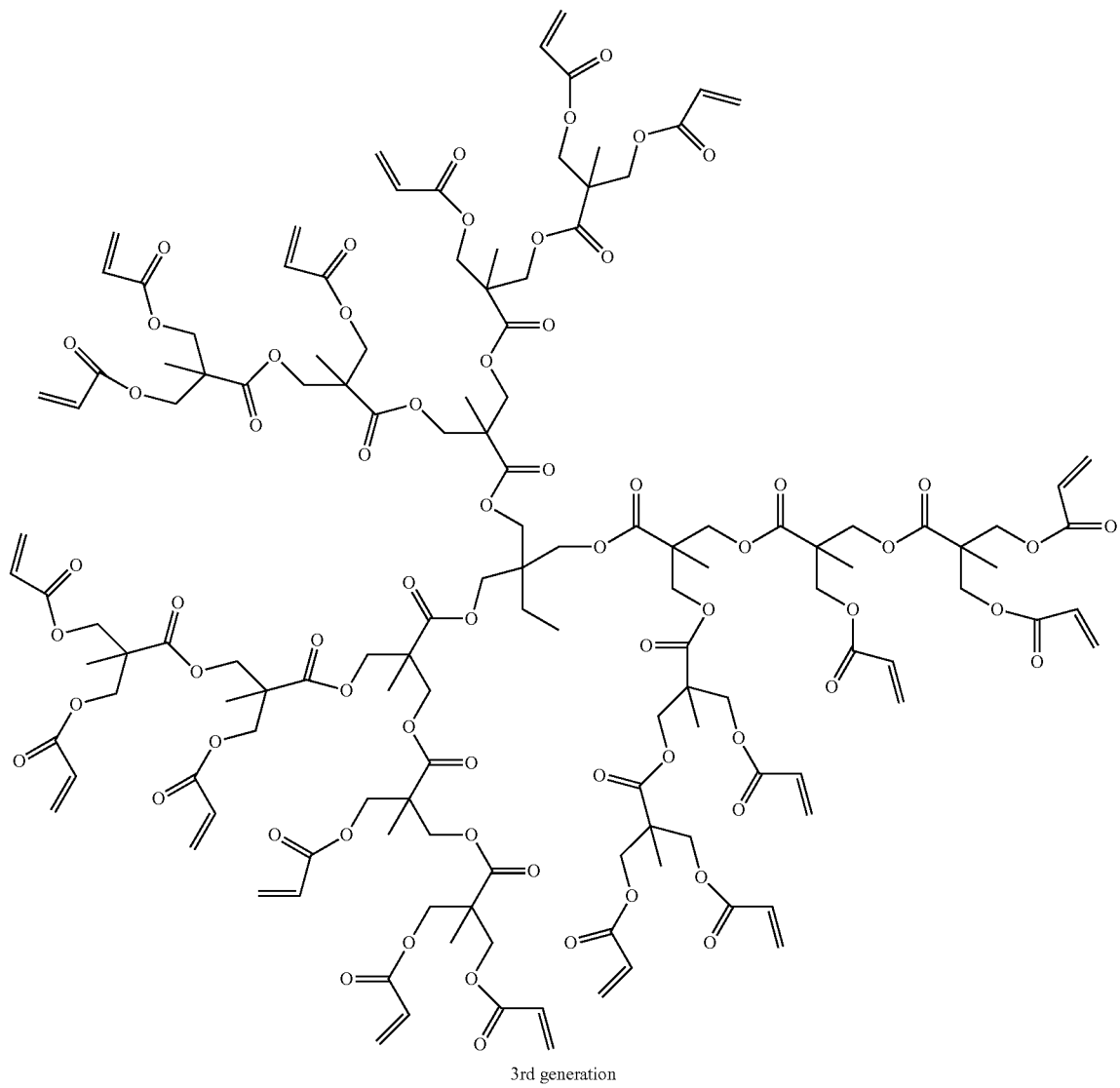 [SMILES: C=CC(=O)OCC(C)(COC(=O)C=C)C(=O)OCC(C)(COC(=O)C=C)C(=O)OCC(C)(COC(=O)C(C)(COC(=O)C=C)COC(=O)C(C)(COC(=O)C=C)COC(=O)C=C)C(=O)OCC(CC)(COC(=O)C(C)(COC(=O)C(C)(COC(=O)C=C)COC(=O)C(C)(COC(=O)C=C)COC(=O)C=C)COC(=O)C(C)(COC(=O)C=C)COC(=O)C(C)(COC(=O)C=C)COC(=O)C=C)COC(=O)C(C)(COC(=O)C(C)(COC(=O)C=C)COC(=O)C(C)(COC(=O)C=C)COC(=O)C=C)COC(=O)C(C)(COC(=O)C=C)COC(=O)C(C)(COC(=O)C=C)COC(=O)C=C]

3rd generation

In Scheme 1, the dendrimer compound according to an embodiment of the disclosure is configured to have a first-generation dendrimer structure in which DMPA (dimethylol propionic acid) is condensed from TMP (trimethylolpropane), acting as the center. Thereafter, the branch structure DMPA is repeatedly polycondensed to thus increase the generation of the dendrimer. After the third generation, a dendrimer compound provided with a polyfunctional acrylic end group by polycondensing acrylic acid at the end thereof may result.

The polyfunctional (meth)acryl-based dendrimer compound of Chemical Formula 3 having the structure of the second or third generation is preferable because a hard coating composition having superior hardness and flexibility may be formed. Furthermore, when the reaction is carried out so as to exceed the third generation, gelling may occur, which is undesirable.

The polyfunctional (meth)acryl-based dendrimer compound of this disclosure preferably includes a compound of Chemical Formula 5 below.

[Chemical Formula 5]

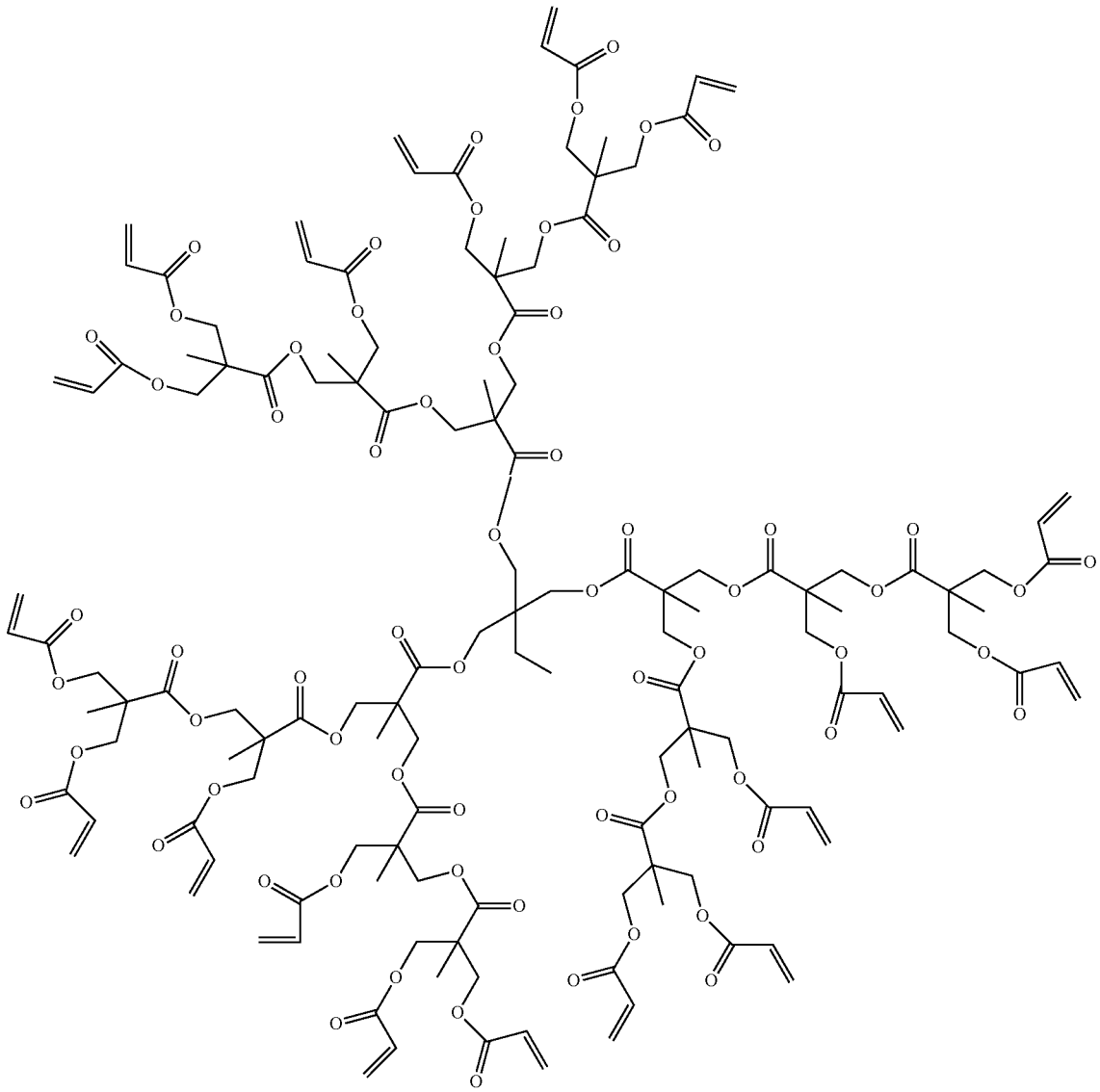

The polyfunctional (meth)acryl-based dendrimer compound of Chemical Formula 3 is contained in an amount of 10 to 50 wt %, and preferably 20 to 40 wt %, based on the total weight of solids in the hard coating composition of this disclosure.

If the amount of the polyfunctional (meth)acryl-based dendrimer compound of Chemical Formula 3 is less than 10 wt %, it is difficult to attain flexibility. On the other hand, if the amount thereof exceeds 50 wt %, unreacted functional groups may be formed due to steric hindrance effects, making it difficult to impart hardness to the hard coating layer.

(C) Polyfunctional Urethane (Meth)Acrylate Having Cyclohexyl Group

The hard coating composition of this disclosure includes a polyfunctional urethane (meth)acrylate having a cyclohexyl group.

The polyfunctional urethane (meth)acrylate including a cyclohexyl group functions to increase the hardness of the hard coating composition.

In addition, the polyfunctional urethane (meth)acrylate including a cyclohexyl group may be prepared by condensing a diisocyanate having a cyclohexyl group with a polyfunctional (meth)acrylate having a hydroxyl group.

The diisocyanate having a cyclohexyl group is not particularly limited, but preferably includes at least one selected from the group consisting of 1,4-cyclohexyl diisocyanate, isophorone diisocyanate, and 4,4-dicyclohexylmethane diisocyanate.

The polyfunctional (meth)acrylate including a hydroxyl group is not particularly limited, but preferably includes at least one selected from the group consisting of trimethylol propane di(meth)acrylate, pentaerythritol tri(meth)acrylate, and dipentaerythritol penta(meth)acrylate.

In addition, the polyfunctional urethane (meth)acrylate having a cyclohexyl group preferably includes a compound of Chemical Formula 6 below.

[Chemical Formula 6]

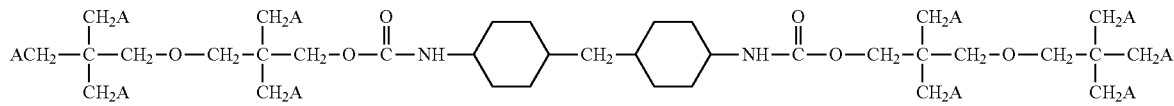

In Chemical Formula 6, A is

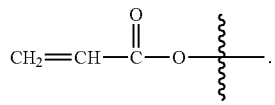

The polyfunctional urethane (meth)acrylate including a cyclohexyl group is comprised in an amount of 15 to 45 wt %, preferably 20 to 40 wt %, based on the total weight of solids in the hard coating composition of this disclosure.

If the amount of the polyfunctional urethane (meth) acrylate including a cyclohexyl group is less than 15 wt %, mechanical properties, especially hardness, may decrease. On the other hand, if the amount thereof exceeds 45 wt %, contraction force may increase and the film formed by applying the hard coating composition may curl, break or crack.

(D) Polyfunctional (Meth)Acrylate Including Ethylene Glycol Group

In the hard coating composition of this disclosure including the polyfunctional urethane (meth)acrylate including a cyclohexyl group, the hard coating composition may further include a polyfunctional (meth)acrylate including an ethylene glycol group.

The polyfunctional (meth)acrylate including an ethylene glycol group is able to impart flexibility to the hard coating composition, and functions to adjust the curing density to thus prevent cracking of the hard coating layer and to restrict curling.

The polyfunctional (meth)acrylate including an ethylene glycol group may be obtained in a manner in which a polyhydric alcohol is subjected to an additional reaction with ethylene oxide to give a polyfunctional alcohol including an ethylene glycol group, which is then condensed with (meth)acrylic acid.

The polyhydric alcohol includes at least one selected from the group consisting of glycerol, trimethylol propane, pentaerythritol, and dipentaerythritol.

The polyfunctional (meth)acrylate including an ethylene glycol group includes, for example, at least one selected from the group consisting of trimethylolpropane($EO)_3$ tri(meth)acrylate, trimethylolpropane($EO)_6$ tri(meth)acrylate, trimethylolpropane($EO)_9$ tri(meth)acrylate, glycerin ($EO)_3$ tri(meth)acrylate, glycerin ($EO)_6$ tri(meth)acrylate, glycerin ($EO)_9$ tri(meth)acrylate, pentaerythritol ($EO)_4$ tetra(meth)acrylate, pentaerythritol ($EO)_8$ tetra(meth)acrylate, pentaerythritol ($EO)_{12}$ tetra(meth)acrylate, dipentaerythritol ($EO)_6$ hexa(meth)acrylate, dipentaerythritol ($EO)_{12}$ hexa(meth)acrylate, and dipentaerythritol ($EO)_{18}$ hexa(meth)acrylate.

In addition, the polyfunctional (meth)acrylate including an ethylene glycol group may include a compound of Chemical Formula 7 below.

[Chemical Formula 7]

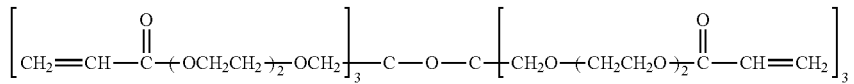

The polyfunctional (meth)acrylate including an ethylene glycol group is contained in an amount of 15 to 35 wt %, and preferably 20 to 30 wt %, based on the total weight of solids in the hard coating composition of this disclosure.

If the amount of the polyfunctional (meth)acrylate including an ethylene glycol group is less than 15 wt %, it is difficult to ensure hardness. On the other hand, if the amount thereof exceeds 35 wt %, it is difficult to ensure flexibility.

(E) Photoinitiator

The hard coating composition of this disclosure includes a photoinitiator.

The photoinitiator is added to conduct photocuring, and the kind thereof is not particularly limited so long as it is useful in the art.

The photoinitiator may include a Type 1 initiator for producing a radical through molecular decomposition depending on the chemical structure or molecular binding energy difference and a hydrogen-abstraction Type 2 initiator that co-exists with a tertiary amine.

Specific examples of the Type 1 initiator may include acetophenones, such as 4-phenoxydichloroacetophenone, 4-t-butyldichloroacetophenone, 4-t-butyltrichloroacetophenone, diethoxyacetophenone, 2-hydroxy-2-methyl-1-phenylpropan-1-one, 1-(4-isopropylphenyl)-2-hydroxy-2-methylpropan-1-one, 1-(4-dodecylphenyl)-2-hydroxy-2-methylpropan-1-one, 4-(2-hyroxyethoxy)-phenyl(2-hydroxy-2-propyl)ketone and 1-hydroxycyclohexylphenyl ketone; benzoins, such as benzoin, benzoin methyl ether, benzoin ethyl ether and benzyl dimethylketal; acylphosphine oxides; and titanocene compounds.

Specific examples of the Type 2 initiator may include benzophenones, such as benzophenone, benzoyl benzoic acid, benzoyl benzoic acid methyl ether, 4-phenyl benzophenone, hydroxybenzophenone, 4-benzol-4'-methyldiphenyl sulfide and 3,3'-methyl-4-methoxybenzophenone; and thioxanthones, such as thioxanthone, 2-chlorothioxanthone, 2-methylthioxanthone, 2,4-dimethylthioxanthone and isopropyl thioxanthone.

The above photoinitiator compounds may be used alone or in a combination of two or more. Also, Type 1 and Type 2 may be used alone or in combination.

The photoinitiator is included in an amount that enables photopolymerization to be sufficiently carried out, and particularly in an amount of 0.1 to 10 wt %, and preferably 1 to 5 wt %, based on the total weight of solids in the hard coating composition of this disclosure.

If the amount of the photoinitiator is less than 0.1 wt %, curing does not sufficiently occur, making it difficult to expect improvements in mechanical properties and adhesion of the hard coating layer formed of the hard coating composition. On the other hand, if the amount of the photoinitiator exceeds 10 wt %, poor adhesion, breaking and curling may be caused by the curing shrinkage.

(F) Solvent

The hard coating composition of this disclosure includes a solvent.

So long as it is useful in the art, the kind of solvent is not particularly limited.

Specific examples of the solvent may include alcohols, such as methanol, ethanol, isopropanol, butanol and propylene glycol methoxy alcohol; ketones, such as methyl ethyl ketone, methyl butyl ketone, methyl isobutyl ketone, diethyl ketone and dipropyl ketone; acetates, such as methyl acetate, ethyl acetate, butyl acetate and propylene glycol methoxy acetate; cellosolves, such as methyl cellosolve, ethyl cellosolve and propyl cellosolve; and hydrocarbons, such as n-hexane, n-heptane, benzene, toluene and xylene.

The solvent is included in an amount of 5 to 90 wt %, and preferably 20 to 70 wt %, based on the total weight of the hard coating composition of this disclosure.

If the amount of the solvent is less than 5 wt %, the viscosity of the hard coating composition may increase, undesirably deteriorating workability. On the other hand, if the amount thereof exceeds 90 wt %, it is difficult to adjust the thickness of the hard coating layer and dry staining may occur, undesirably causing a poor outer appearance.

(G) Inorganic Nanoparticles

The hard coating composition of this disclosure may further include inorganic nanoparticles.

The inorganic nanoparticles are uniformly distributed in the hard coating layer formed of the hard coating composition, thus, further improving mechanical properties such as abrasion resistance, scratch resistance and pencil hardness.

The inorganic nanoparticles have an average particle size of 1 to 100 nm, and preferably 5 to 50 nm.

If the average particle size of the inorganic nanoparticles is less than 1 nm, aggregation may occur in the hard coating composition, making it impossible to form a uniform hard coating layer, and the aforementioned effects cannot be exhibited. On the other hand, if the average particle size of the inorganic nanoparticles exceeds 100 nm, the optical properties and mechanical properties of the hard coating layer may decrease.

The inorganic nanoparticles are made of a metal oxide. Specifically, the inorganic nanoparticles may include at least one selected from the group consisting of $Al_2O_3$, $SiO_2$, ZnO, $ZrO_2$, $BaTiO_3$, $TiO_2$, $Ta_2O_5$, $Ti_3O_5$, ITO, IZO, ATO, ZnO—Al, $Nb_2O_3$, SnO, and MgO. Preferably useful is at least one selected from the group consisting of $Al_2O_3$, $SiO_2$, and $ZrO_2$.

The inorganic nanoparticles may be included in an amount of 5 to 40 wt %, and preferably 10 to 30 wt %, based on the total weight of solids in the hard coating composition of this disclosure.

If the amount of the inorganic nanoparticles is less than 5 wt %, mechanical properties such as abrasion resistance, scratch resistance and pencil hardness of the hard coating composition are not improved. On the other hand, if the amount thereof exceeds 40 wt %, the curability of the hard coating composition may be hindered, and thus the mechanical properties may deteriorate and the outer appearance of the hard coating layer may become poor.

(H) Additive

The hard coating composition of this disclosure may further include an additive, as necessary.

Specifically, the additive may be a leveling agent or a stabilizer.

The leveling agent is added to improve smoothness and applicability of a coating film upon application of the composition, and a silicone leveling agent, a fluorine-based leveling agent, and an acrylic leveling agent may be used. Commercially available leveling agent products may include BYK-323, BYK-331, BYK-333, BYK-337, BYK-373, BYK-375, BYK-377, and BYK-378, available from CHEMIE, TEGO Glide 410, TEGO Glide 411, TEGO Glide 415, TEGO Glide 420, TEGO Glide 432, TEGO Glide 435, TEGO Glide 440, TEGO Glide 450, TEGO Glide 455, TEGO Rad 2100, TEGO Rad 2200N, TEGO Rad 2250, TEGO Rad 2300, and TEGO Rad 2500, available from DEGGUSA, and FC-4430 and FC-4432, available from 3M.

The leveling agent is preferably included in an amount of 3 to 5 wt % based on the total weight of the hard coating composition of this disclosure.

The stabilizer may include a UV stabilizer and a thermal stabilizer.

When the surface of the coating film obtained by curing the hard coating composition is exposed to UV light, it may degrade and may thus discolor and easily break down. Hence, a UV stabilizer may be used to block or absorb UV light to thus protect the surface of the coating film.

The UV stabilizer may be classified into, depending on the action mechanism, an absorbent, a quencher, and a hindered amine light stabilizer (HALS). Also, it may be classified into, depending on the chemical structure, a phenyl salicylate absorbent, a benzophenone absorbent, a benzotriazole absorbent, a nickel derivative quencher, and a radical scavenger.

The kind of UV stabilizer is not particularly limited so long as it does not significantly change the initial color of the hard coating layer formed of the hard coating composition.

The thermal stabilizer may include primary thermal stabilizers such as polyphenols and secondary thermal stabilizers such as phosphites and lactones, as industrially applicable products, which may be used alone or in combination. The UV stabilizer and the thermal stabilizer may be used in appropriate amounts at a level that does not affect UV curability, and may be used in an amount of 0.1 to 3 wt % based on the total weight of the hard coating composition of this disclosure.

In addition, the disclosure addresses a hard coating film formed by applying the hard coating composition of this disclosure.

The hard coating film may include a hard coating layer formed from the hard coating composition on one or both surfaces of a substrate.

The substrate may be used without particular limitation so long as it is a transparent polymer film. Examples of the polymer of the film may include triacetyl cellulose, acetyl cellulose butylate, ethylene-acetic acid vinyl copolymer, propionyl cellulose, butyryl cellulose, acetyl propionyl cellulose, polyester, polystyrene, polyamide, polyetherimide, polyacryl, polyimide, polyethersulfone, polysulfone, polyethylene, polypropylene, polymethylpentene, polyvinyl chloride, polyvinylidene chloride, polyvinyl alcohol, polyvinylacetal, polyetherketone, polyetheretherketone, polyethersulfone, polymethyl methacrylate, polyethylene terephthalate, polybutylene terephthalate, polyethylene naphthalate, and polycarbonate. These polymers may be used alone or in combinations of two or more.

Among the above substrate films, a crystalline polymer substrate film, which is difficult to impart with adhesion after a coating process, an engineering plastic substrate, or a polymer substrate film, the surface of which becomes hydrophilic due to hydrolysis or saponification, is difficult to impart with enhanced adhesion when using a typical hard coating composition. Furthermore, when a typical hard coating composition is used, mechanical properties may deteriorate in order to realize high adhesion. However, the hard coating composition of this disclosure may exhibit superior adhesion to such a substrate film without any deterioration of mechanical properties.

The substrate may be subjected to surface treatment, such as plasma treatment or corona treatment, in order to enhance adhesion to the hard coating layer.

The hard coating layer is formed by applying a composition for forming a hard coating layer on the substrate film and then curing it, and the above application process may be performed through any known process such as slit coating, knife coating, spin coating, casting, micro gravure coating, gravure coating, bar coating, roll coating, wire bar coating, dip coating, spray coating, screen printing, gravure printing, flexo printing, offset printing, inkjet coating, dispenser printing, nozzle coating, capillary coating, etc.

The thickness of the hard coating layer is not particularly limited, and may be, for example, 5 to 100 μm. Given the above thickness range, higher hardness and flexibility may result and curling may be prevented.

In addition, the disclosure addresses a window film including the above hard coating film.

A window film, which is located at the upper position of a display device, is insufficiently flexible and thus cannot be used for a flexible display device.

However, the hard coating film of this disclosure has high flexibility, and thus the window film including the above hard coating film may be applied to a flexible display device.

In addition, this disclosure addresses a display device including the above hard coating film.

The hard coating film has high hardness and flexibility and thus may be used for a flexible display device.

The display device may be any of various display devices, such as liquid crystal displays, electroluminescent displays, plasma displays and field-emission displays.

A better understanding of the disclosure may be obtained via the following examples that are merely set forth to illustrate, and such examples may be appropriately modified and altered within the scope and spirit of the disclosure, as apparent to those skilled in the art, without departing from the scope and spirit of the disclosure, as disclosed in the accompanying claims.

Preparation of Hard Coating Composition

Examples 1 to 8 and Comparative Examples 1 to 3

The hard coating compositions of Examples 1 to 8 and Comparative Examples 1 to 3 were prepared using components in the amounts shown in Table 1 below.

TABLE 1

(unit: wt %)

| | Silazane compound | | Polyfunctional (meth)acryl-based dendrimer compound | Polyfunctional monomer | Photoinitiator | Leveling agent | Solvent |
| --- | --- | --- | --- | --- | --- | --- | --- |
| | A-1 | A-2 | | | | | |
| Ex. 1 | 30 | — | 20 | 30 | 2 | 0.3 | 17.7 |
| Ex. 2 | 15 | — | 40 | 25 | 2 | 0.3 | 17.7 |
| Ex. 3 | 20 | — | 30 | 30 | 2 | 0.3 | 17.7 |
| Ex. 4 | 40 | — | 20 | 20 | 2 | 0.3 | 17.7 |
| Ex. 5 | — | 30 | 20 | 30 | 2 | 0.3 | 17.7 |
| Ex. 6 | — | 15 | 40 | 25 | 2 | 0.3 | 17.7 |
| Ex. 7 | — | 20 | 30 | 30 | 2 | 0.3 | 17.7 |
| Ex. 8 | — | 40 | 20 | 20 | 2 | 0.3 | 17.7 |
| C. Ex. 1 | — | — | 20 | 60 | 2 | 0.3 | 17.7 |
| C. Ex. 2 | — | — | 25 | 55 | 2 | 0.3 | 17.7 |
| C. Ex. 3 | — | — | 40 | 40 | 2 | 0.3 | 17.7 |

Silazane Compound

A-1:

[Chemical Formula 8]

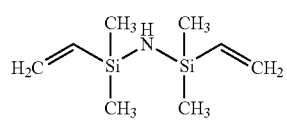

A-2:

[Chemical Formula 9]

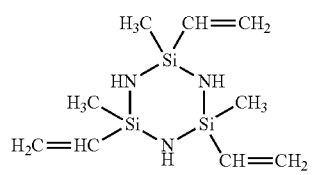

Polyfunctional (Meth)Acryl-Based Dendrimer Compound:

[Chemical Formula 5]
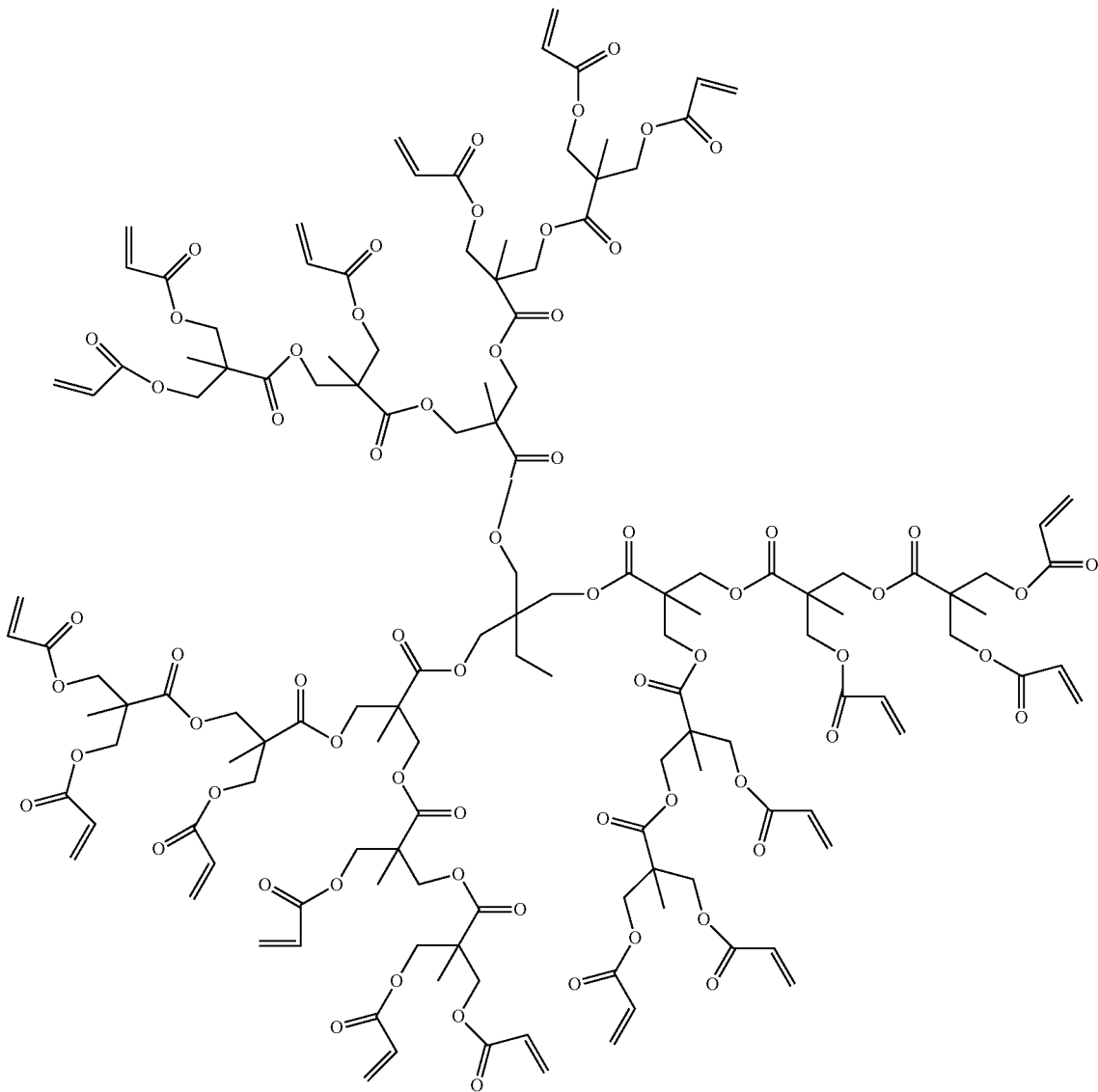
Polyfunctional Monomer:
[Chemical Formula 10]
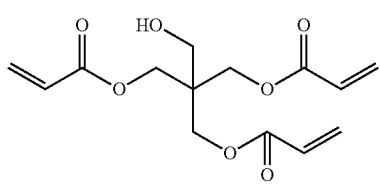
Photoinitiator: 1-Hydroxy-cyclohexyl-phenyl-ketone
Leveling agent: BYK-333
Solvent: methyl ethyl ketone
Examples 9 to 20 and Comparative Examples 4 to 6
The hard coating compositions of Examples 9 to 20 and Comparative Examples 4 to 6 were prepared using components in the amounts shown in Table 2 below.

TABLE 2

| | Silazane compound | | Polyfunctional urethane (meth)acrylate having cyclohexyl group | Polyfunctional (meth)acrylate having ethylene glycol group | Photoinitiator | Leveling agent | Solvent |
|---|---|---|---|---|---|---|---|
| | A-1 | A-2 | | | | | |
| Ex. 9 | 15 | — | 40 | — | 2 | 0.3 | 42.7 |
| Ex. 10 | 30 | — | 20 | — | 2 | 0.3 | 47.7 |
| Ex. 11 | 20 | — | 30 | — | 2 | 0.3 | 47.7 |
| Ex. 12 | 40 | — | 20 | — | 2 | 0.3 | 37.7 |
| Ex. 13 | 15 | — | 40 | 25 | 2 | 0.3 | 17.7 |
| Ex. 14 | 30 | — | 20 | 30 | 2 | 0.3 | 17.7 |
| Ex. 15 | 20 | — | 30 | 30 | 2 | 0.3 | 17.7 |
| Ex. 16 | 40 | — | 20 | 20 | 2 | 0.3 | 17.7 |
| Ex. 17 | — | 15 | 40 | 25 | 2 | 0.3 | 17.7 |
| Ex. 18 | — | 30 | 20 | 30 | 2 | 0.3 | 17.7 |
| Ex. 19 | — | 20 | 30 | 30 | 2 | 0.3 | 17.7 |
| Ex. 20 | — | 40 | 20 | 20 | 2 | 0.3 | 17.7 |
| C. Ex. 4 | — | — | 20 | 60 | 2 | 0.3 | 17.7 |
| C. Ex. 5 | — | — | 25 | 55 | 2 | 0.3 | 17.7 |
| C. Ex. 6 | — | — | 40 | 40 | 2 | 0.3 | 17.7 |

(unit: parts by weight)

Silazane Compound

A-1:

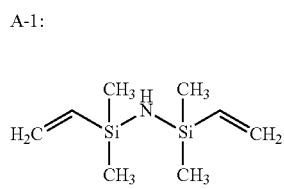

[Chemical Formula 8]

A-2:

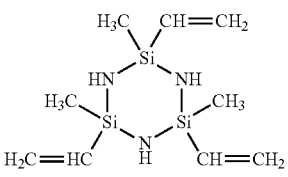

[Chemical Formula 9]

Polyfunctional Urethane (Meth)Acrylate Having a Cyclohexyl Group:

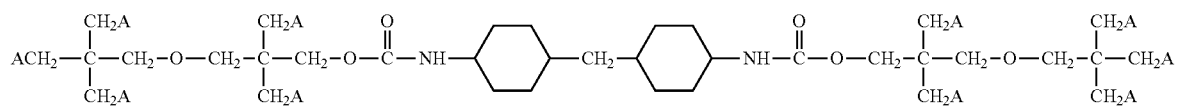

[Chemical Formula 6]

In Chemical Formula 6, A is

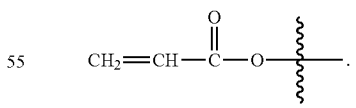

Polyfunctional (Meth)Acrylate Having an Ethylene Glycol Group:

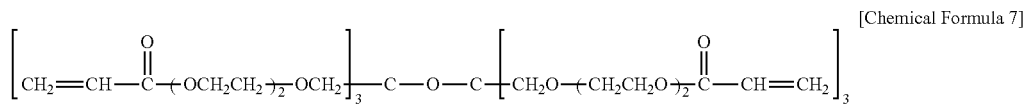

[Chemical Formula 7]

Photoinitiator: 1-Hydroxy-cyclohexyl-phenyl-ketone
Leveling agent: BYK-333
Solvent: Methyl ethyl ketone Test Example 1. Preparation of Hard Coating Film and Evaluation of Properties Thereof Each of the hard coating compositions of Examples 1 to 20 and Comparative Examples 1 to 6 was applied on an optical polyimide film (100 μm) so as to have a dry coating thickness of 20 μm, dried in an oven at 80° C. for 2 minutes, and irradiated with light at 350 mJ/cm$^2$ using a high-pressure mercury lamp, thus manufacturing respective hard coating films.

1-1. Measurement of Pencil Hardness

Pencil hardness was measured under a load of 500 g using a pencil hardness tester (PHT, SUKBO SCIENCE, Korea). A pencil available from MITSUBISHI was used, and five measurements were performed per pencil hardness. The maximum pencil hardness causing 1 or fewer scratches was taken as the pencil hardness of the corresponding hard coating layer. The results are shown in Table 3 below.

1-2. Measurement of Scratch Resistance

Scratch resistance was tested through 10 reciprocating motions under 1 kg/(2 cm×2 cm) using a steel wool tester (WT-LCM100, PROTECH, Korea). #0000 steel wool was used.

The evaluation criteria are as follows. The results are shown in Table 3 below.
<Evaluation Criteria>
S: zero scratches
A: 1 to 10 scratches
B: 11 to 20 scratches
C: 21 to 30 scratches
D: 31 or more scratches 1-3. Measurement of Adhesion 100 squares were made by drawing 11 lines on each of width and length axes at an interval of 1 mm on the coating surface of the film, and a peeling test was performed three times using a piece of tape (CT-24, NICHIBAN, Japan). Three sets of 100 squares were tested and the results were averaged.

Adhesion was recorded as follows.

Adhesion=$n/100$ wherein n: the number of unpeeled squares among all squares
100: the number of all squares
Therefore, the case where no peeling occurred was recorded as 100/100.

The results of measurement of adhesion are shown in Table 3 below.

1-4. Measurement of Curl

A sample cut to a square shape of A4 size (29.7×21.0 cm) was placed on a flat glass plate so that the coating surface of the film was positioned upward, after which the height of each corner of the sample curled upward from the surface of the glass plate was measured at 25° C. and 50% RH and averaged. The results are shown in Table 3 below.

1-5. Measurement of Mandrel

In order to evaluate the flexibility and cracking of the hard coating film, a coating film sample cut to a size of 1 cm×10 cm was placed on each of iron rods having diameters of 2ϕ to 16ϕ, the sample was bent by hand under the condition that the hard coating layer was positioned upward, and the smallest diameter at which the surface was not cracked was measured. The results are shown in Table 3 below.

TABLE 3

| | Pencil hardness | Scratch resistance | Adhesion | Curl | Mandrel |
|---|---|---|---|---|---|
| Ex. 1 | 6 H | S | 100/100 | 2 mm | 2 ϕ |
| Ex. 2 | 5 H | S | 100/100 | 2 mm | 2 ϕ |
| Ex. 3 | 6 H | S | 100/100 | 2 mm | 3 ϕ |
| Ex. 4 | 5 H | S | 100/100 | 2 mm | 3 ϕ |
| Ex. 5 | 5 H | S | 100/100 | 2 mm | 2 ϕ |
| Ex. 6 | 6 H | S | 100/100 | 2 mm | 3 ϕ |
| Ex. 7 | 5 H | S | 100/100 | 2 mm | 3 ϕ |
| Ex. 8 | 6 H | S | 100/100 | 3 mm | 3 ϕ |
| Ex. 9 | 5 H | S | 100/100 | 3 mm | 3 ϕ |
| Ex. 10 | 5 H | S | 100/100 | 2 mm | 2 ϕ |
| Ex. 11 | 5 H | S | 100/100 | 3 mm | 3 ϕ |
| Ex. 12 | 5 H | S | 100/100 | 3 mm | 3 ϕ |
| Ex. 13 | 6 H | S | 100/100 | 3 mm | 2 ϕ |
| Ex. 14 | 6 H | S | 100/100 | 3 mm | 3 ϕ |
| Ex. 15 | 6 H | S | 100/100 | 2 mm | 3 ϕ |
| Ex. 16 | 6 H | S | 100/100 | 2 mm | 3 ϕ |
| Ex. 17 | 6 H | S | 100/100 | 3 mm | 3 ϕ |
| Ex. 18 | 6 H | S | 100/100 | 2 mm | 3 ϕ |
| Ex. 19 | 5 H | S | 100/100 | 3 mm | 2 ϕ |
| Ex. 20 | 5 H | S | 100/100 | 2 mm | 3 ϕ |
| C. Ex. 1 | H | C | 100/100 | 12 mm | 14 ϕ |
| C. Ex. 2 | H | C | 100/100 | 15 mm | 16 ϕ |
| C. Ex. 3 | HB | C | 100/100 | 16 mm | 16 ϕ |
| C. Ex. 4 | HB | C | 100/100 | 11 mm | 12 ϕ |
| C. Ex. 5 | H | C | 100/100 | 12 mm | 14 ϕ |
| C. Ex. 6 | H | C | 100/100 | 10 mm | 12 ϕ |

As is apparent from the results of Table 3, the hard coating films manufactured using the hard coating compositions of Examples 1 to 20 according to this disclosure exhibited superior pencil hardness, scratch resistance, adhesion, curl and Mandrel.

The hard coating composition of the disclosure can be found to be superior in hardness and flexibility.

In contrast, the hard coating films manufactured using the hard coating compositions of Comparative Examples 1 to 6, not containing the silazane compound of Chemical Formula 1 or 2, were poor in all evaluation items other than adhesion.

Therefore, the hard coating composition of this disclosure is superior in scratch resistance, hardness and flexibility, and a hard coating film using the same and a display device, especially a flexible display device, including the hard coating film can be provided.

Although the preferred embodiments of this application have been disclosed for illustrative purposes, those skilled in the art will appreciate that various modifications, additions and substitutions are possible, without departing from the scope and spirit of the application as disclosed in the accompanying claims.

What is claimed is:

1. A hard coating composition comprising:
a silazane compound of Chemical Formula 1 or 2 below,
a polyfunctional (meth)acryl-based dendrimer compound of Chemical Formula 3 below or a polyfunctional urethane (meth)acrylate having a cyclohexyl group, a photoinitiator, and
a solvent, wherein:

[Chemical Formula 1]

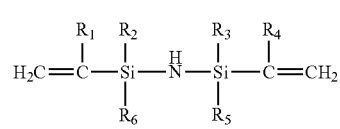

-continued

[Chemical Formula 2]

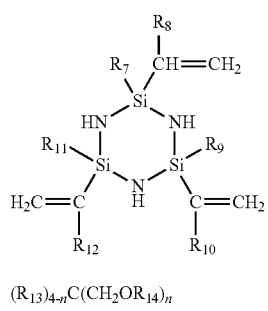

[Chemical Formula 3]

$(R_{13})_{4-n}C(CH_2OR_{14})_n$ wherein $R_1$ to $R_6$, which are independently identical to or different from each other, are an alkyl group having 1 to 10 carbon atoms, $R_7$ to $R_{12}$, which are independently identical to or different from each other, are hydrogen or an alkyl group having 1 to 10 carbon atoms, $R_{13}$ is an alkyl group having 2 to 5 carbon atoms, n is an integer of 2 to 4, and $R_{14}$ is a compound of Chemical Formula 4 below:

[Chemical Formula 4]

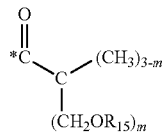

wherein m is 2 or 3, and $R_{15}$ is hydrogen or a (meth)acrylate group, at least one $R_{15}$ being a (meth)acrylate group.

2. The hard coating composition of claim 1, wherein the polyfunctional (meth)acryl-based dendrimer compound of Chemical Formula 3 includes a compound of Chemical Formula 5 below.

[Chemical Formula 5]

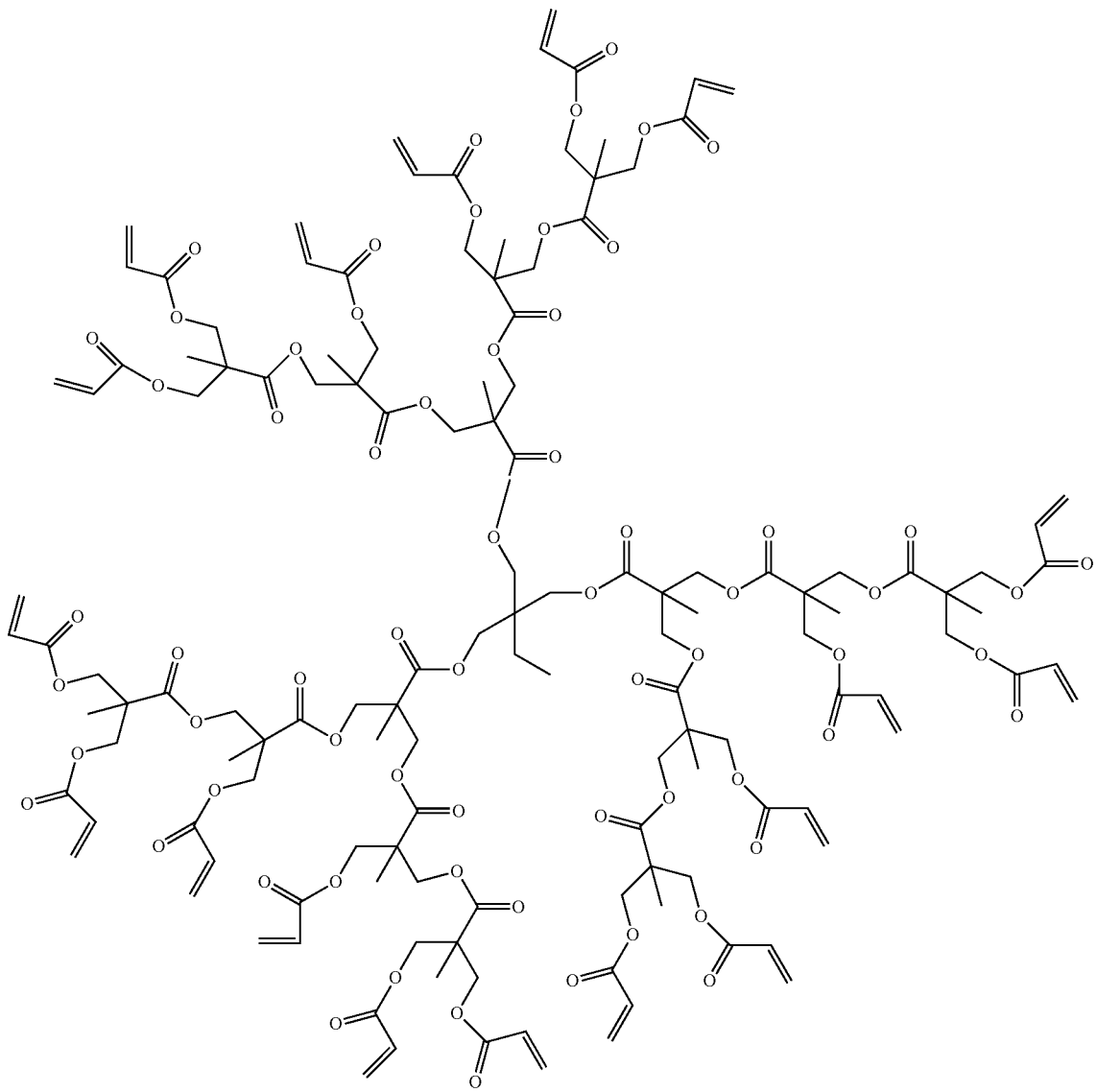

3. The hard coating composition of claim 1, wherein the polyfunctional urethane (meth)acrylate having a cyclohexyl group is prepared by condensing a diisocyanate having a cyclohexyl group and a polyfunctional (meth)acrylate having a hydroxyl group.

4. The hard coating composition of claim 3, wherein the diisocyanate having a cyclohexyl group comprises at least one selected from the group consisting of 1,4-cyclohexyl diisocyanate, isophorone diisocyanate, and 4,4-dicyclohexylmethane diisocyanate.

5. The hard coating composition of claim 3, wherein the polyfunctional (meth)acrylate having a hydroxyl group comprises at least one selected from the group consisting of trimethylolpropane di(meth)acrylate, pentaerythritol tri(meth)acrylate, and dipentaerythritol penta(meth)acrylate.

6. The hard coating composition of claim 1, wherein the polyfunctional urethane (meth)acrylate having a cyclohexyl group includes a compound of Chemical Formula 6 below:

[Chemical Formula 6]

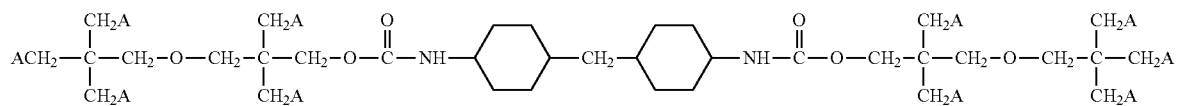

wherein A is

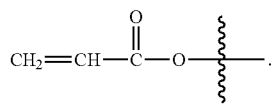

7. The hard coating composition of claim 1, wherein the hard coating composition including the polyfunctional urethane (meth)acrylate having a cyclohexyl group further includes a polyfunctional (meth)acrylate having an ethylene glycol group.

8. The hard coating composition of claim 7, wherein the polyfunctional (meth)acrylate having an ethylene glycol group is prepared by subjecting a polyhydric alcohol to an addition reaction with ethylene oxide to obtain a polyfunctional alcohol having an ethylene glycol group and then condensing the polyfunctional alcohol with (meth)acrylic acid.

9. The hard coating composition of claim 8, wherein the polyhydric alcohol comprises at least one selected from the group consisting of glycerol, trimethylol propane, pentaerythritol, and dipentaerythritol.

10. The hard coating composition of claim 7, wherein the polyfunctional (meth)acrylate having an ethylene glycol group comprises at least one selected from the group consisting of trimethylolpropane(EO)$_3$ tri(meth)acrylate, trimethylolpropane(EO)$_6$ tri(meth)acrylate, trimethylolpropane(EO)$_9$ tri(meth)acrylate, glycerin (EO)$_3$ tri(meth)acrylate, glycerin (EO)$_6$ tri(meth)acrylate, glycerin (EO)$_9$ tri(meth) acrylate, pentaerythritol(EO)$_4$ tetra(meth)acrylate, pentaerythritol(EO)$_8$ tetra(meth)acrylate, pentaerythritol(EO)$_{12}$ tetra(meth)acrylate, dipentaerythritol(EO)$_6$ hexa(meth)acrylate, dipentaerythritol(EO)$_{12}$ hexa(meth)acrylate, and dipentaerythritol(EO)$_{18}$ hexa(meth)acrylate.

11. The hard coating composition of claim 7, wherein the polyfunctional (meth)acrylate having an ethylene glycol group includes a compound of Chemical Formula 7 below.

[Chemical Formula 7]

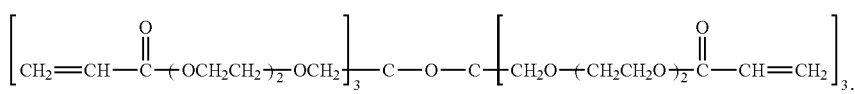

12. The hard coating composition of claim 1, comprising, based on a total weight of solids in the hard coating composition, 10 to 50 wt % of the silazane compound of Chemical Formula 1 or 2, 10 to 50 wt % of the polyfunctional (meth)acryl-based dendrimer compound, and 0.1 to 10 wt % of the photoinitiator, and, based on a total weight of the hard coating composition, 5 to 90 wt % of the solvent.

13. The hard coating composition of claim 1, comprising, based on a total weight of solids in the hard coating composition, 10 to 50 wt % of the silazane compound of Chemical Formula 1 or 2, 15 to 45 wt % of the polyfunctional urethane (meth)acrylate having a cyclohexyl group, and 0.1 to 10 wt % of the photoinitiator, and, based on a total weight of the hard coating composition, 5 to 90 wt % of the solvent.

14. The hard coating composition of claim 7, wherein the polyfunctional (meth)acrylate having an ethylene glycol group is contained in an amount of 15 to 35 wt % based on a total weight of solids in the hard coating composition.

15. The hard coating composition of claim 1, further comprising inorganic nanoparticles.

16. The hard coating composition of claim 15, wherein the inorganic nanoparticles have an average particle size of 1 to 100 nm.

17. The hard coating composition of claim 15, wherein the inorganic nanoparticles are contained in an amount of 5 to 40 wt % based on a total weight of solids in the hard coating composition.

18. The hard coating composition of claim 1, further comprising an additive.

19. A hard coating film formed by applying the hard coating composition of claim 1.

20. A window film comprising the hard coating film of claim 19.

21. A display device comprising the hard coating film of claim 19.

22. The display device of claim 21, wherein the display device is a flexible display device.

* * * * *